(12) United States Patent
Matsumura

(10) Patent No.: US 7,975,742 B2
(45) Date of Patent: Jul. 12, 2011

(54) MOTORCYCLE TIRE FOR OFF-ROAD

(75) Inventor: Sadahiko Matsumura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 718 days.

(21) Appl. No.: 12/068,292

(22) Filed: Feb. 5, 2008

(65) Prior Publication Data

US 2008/0283168 A1    Nov. 20, 2008

(30) Foreign Application Priority Data

May 14, 2007 (JP) ................................. 2007-128033

(51) Int. Cl.
*B60C 9/02* (2006.01)
*B60C 9/04* (2006.01)
(52) U.S. Cl. ............... 152/548; 152/451; 152/556
(58) Field of Classification Search .................. 152/546, 152/451, 548

See application file for complete search history.

(56) References Cited

U.S. PATENT DOCUMENTS

| 4,832,102 | A |   | 5/1989  | Domchick |
|-----------|---|---|---------|----------|
| 5,014,761 | A | * | 5/1991  | Noma et al. ................. 152/527 |
| 5,069,262 | A | * | 12/1991 | Nakasaki et al. ............ 152/536 |
| 6,651,711 | B2| * | 11/2003 | Matsumura ................. 152/209.2 |
| 2005/0017399 | A1 | * | 1/2005 | Otto et al. ..................... 264/184 |

FOREIGN PATENT DOCUMENTS

EP    0 296 093 A1    12/1988
EP    0 835 766 A2    4/1998

* cited by examiner

*Primary Examiner* — Justin Fischer
(74) *Attorney, Agent, or Firm* — Birch, Stewart, Kolasch & Birch, LLP

(57) ABSTRACT

A tire (2) according to the present invention includes a tread (4), a pair of beads (8), and a carcass (10) having a radial structure. The carcass (10) has a first ply (32) and a second ply (34). The first ply (32) has a first cord. The first cord is formed by twisting three yarns. The yarn is constituted by an aramid fiber. A fineness of the yarn is equal to or higher than 800 dtex and is equal to or lower than 1100 dtex. The second ply (34) has a second cord. The second cord is formed by twisting three yarns. The yarn is constituted by the aramid fiber. A fineness of the yarn is equal to or higher than 800 dtex and is equal to or lower than 1100 dtex.

6 Claims, 3 Drawing Sheets

MOTORCYCLE TIRE FOR OFF-ROAD

This application claims priority on Patent Application No. 2007-128033 filed in JAPAN on May 14, 2007, the entire contents of which are hereby incorporated by reference.

BACKGROUND OF THE INVENTION

1. Field of the Invention

The present invention relates to a motorcycle tire for an off-road.

2. Description of the Related Art

A surface of an off-road such as a forest or a field has an undulation. For this reason, an excellent following property to a road surface is required for a motorcycle tire (hereinafter referred to as a tire) to be attached to a motorcycle which runs over an off-road. A tire (a radial tire) including a carcass having a radial structure is attached to the motorcycle. A following property to a road surface of the tire is more excellent than that of a tire (a bias tire) including a carcass having a bias structure.

The tire includes a tread constituted by a crosslinked rubber, a pair of beads and a carcass laid over both of the beads. The tread has a block pattern. A groove formed on the tread divides a tread surface into a large number of blocks so that the block pattern is constituted. An external surface of the block mainly comes in contact with a smooth road surface. A part of the tire is buried in a soft ground and the block sweeps mud. In this case, the block contributes to a tractive force.

The carcass includes a ply having a large number of cords provided in parallel. An absolute value of an angle formed by each of the cords with respect to an equator plane is 65 to 90 degrees. The cord is constituted by a polyester fiber, a nylon fiber, a rayon fiber, a polyethylene naphthalate fiber or an aramid fiber.

EP0835766 (Japanese Laid-Open Patent Publication No. 10-114203) has disclosed a tire which is excellent in a stability and a cornering performance. In the tire, an angle with respect to an equator plane and an elongation in a carcass cord included in a carcass ply are regulated properly.

The cord included in the carcass is usually formed by twisting two yarns. A modulus of a cord constituted by a yarn formed of an aramid fiber is higher than that of a cord constituted by a yarn formed of a polyester fiber, a nylon fiber, a rayon fiber or a polyethylene naphthalate fiber. In order to obtain a tire which is excellent in a stiffness feeling, therefore, a cord constituted by a yarn formed of the aramid fiber is used.

The yarn formed by the aramid fiber usually has a fineness of 1100 dtex or 1670 dtex. In a tire using a cord constituted by a yarn having a fineness of 1100 dtex, the cord causes a fatigue break in some cases. The tire has a poor durability. In a tire using a cord constituted by a yarn having a fineness of 1670 dtex, the fatigue break of the cord can be prevented. The cord can contribute to a durability of the tire. However, the cord has a great weight. For this reason, the cord influences the weight of the tire. Furthermore, the carcass including the cord has an excessive stiffness. Therefore, the carcass influences a following property to a road surface and a stiffness feeling in the tire.

It is an object of the present invention to provide a motorcycle tire for an off-road which is excellent in a following property to a road surface, a stiffness feeling and a durability.

SUMMARY OF THE INVENTION

A motorcycle tire for an off-road according to the present invention comprises a tread constituted by a crosslinked rubber, a pair of beads, and a carcass laid between both of the beads along an inside of the tread and having a radial structure. The tread includes a base and a large number of blocks erected almost outward in a radial direction from the base. The carcass includes a first ply and a second ply. The first ply has a first cord. The first cord is formed by twisting three yarns. The yarn is constituted by an aramid fiber. A fineness of the yarn is equal to or higher than 800 dtex and is equal to or lower than 1100 dtex. The second ply has a second cord. The second cord is formed by twisting three yarns. The yarn is constituted by the aramid fiber. A fineness of the yarn is equal to or higher than 800 dtex and is equal to or lower than 1100 dtex.

In the tire, it is preferable that a density of the first cord in the first ply should be equal to or higher than 30 ends/5 cm and should be equal to or lower than 60 ends/5 cm.

In the tire, it is preferable that a density of the second cord in the second ply should be equal to or higher than 30 ends/5 cm and should be equal to or lower than 60 ends/5 cm.

In the tire, it is preferable that an original twist number of the first cord should be equal to or larger than 30 times/10 cm and should be equal to or smaller than 60 times/10 cm, and a final twist number of the first cord should be equal to or larger than 30 times/10 cm and should be equal to or smaller than 60 times/10 cm.

In the tire, it is preferable that an original twist number of the second cord should be equal to or larger than 30 times/10 cm and should be equal to or smaller than 60 times/10 cm, and a final twist number of the second cord should be equal to or larger than 30 times/10 cm and should be equal to or smaller than 60 times/10 cm.

In the tire, it is preferable that a land/sea ratio of the tread should be equal to or higher than 10%, a block volume ratio of the tread should be equal to or higher than 50% and should be equal to or lower than 100%, and a groove depth of the tread should be equal to or greater than 14 mm and should be equal to or smaller than 19 mm.

In the tire, the first cord is constituted by the yarn formed of the aramid fiber. The first cord has a high modulus. Therefore, the first ply can contribute to a stiffness feeling of the tire. In the tire, the yarn has a fineness which is equal to or higher than 800 dtex and is equal to or lower than 1100 dtex. The fineness of the yarn is lower than that of a conventional yarn constituting a cord formed of the aramid fiber. Since the first cord is formed by twisting three yarns having low finenesses, it has a flexibility. The first ply can contribute to a following property to a road surface of the tire. A fatigue break of the first cord can be prevented. Therefore, the tire has an excellent durability. In the tire, the second cord is constituted by the yarn formed of the aramid fiber. The second cord has a high modulus. Therefore, the second ply can contribute to the stiffness feeling of the tire. In the tire, the yarn has a fineness which is equal to or higher than 800 dtex and is equal to or lower than 1100 dtex. The fineness of the yarn is lower than that of the conventional yarn constituting a cord formed of the aramid fiber. Since the second cord is formed by twisting three yarns having low finenesses, it has a flexibility. The second ply can contribute to a following property to a road surface of the tire. Since a fatigue break of the second cord can be prevented, the tire is excellent in the durability. Therefore, the tire is excellent in the following property to a road surface, the stiffness feeling and the durability.

DESCRIPTION OF THE PREFERRED EMBODIMENTS

The present invention will be described below in detail based on a preferred embodiment with reference to the drawings.

Figure 1:
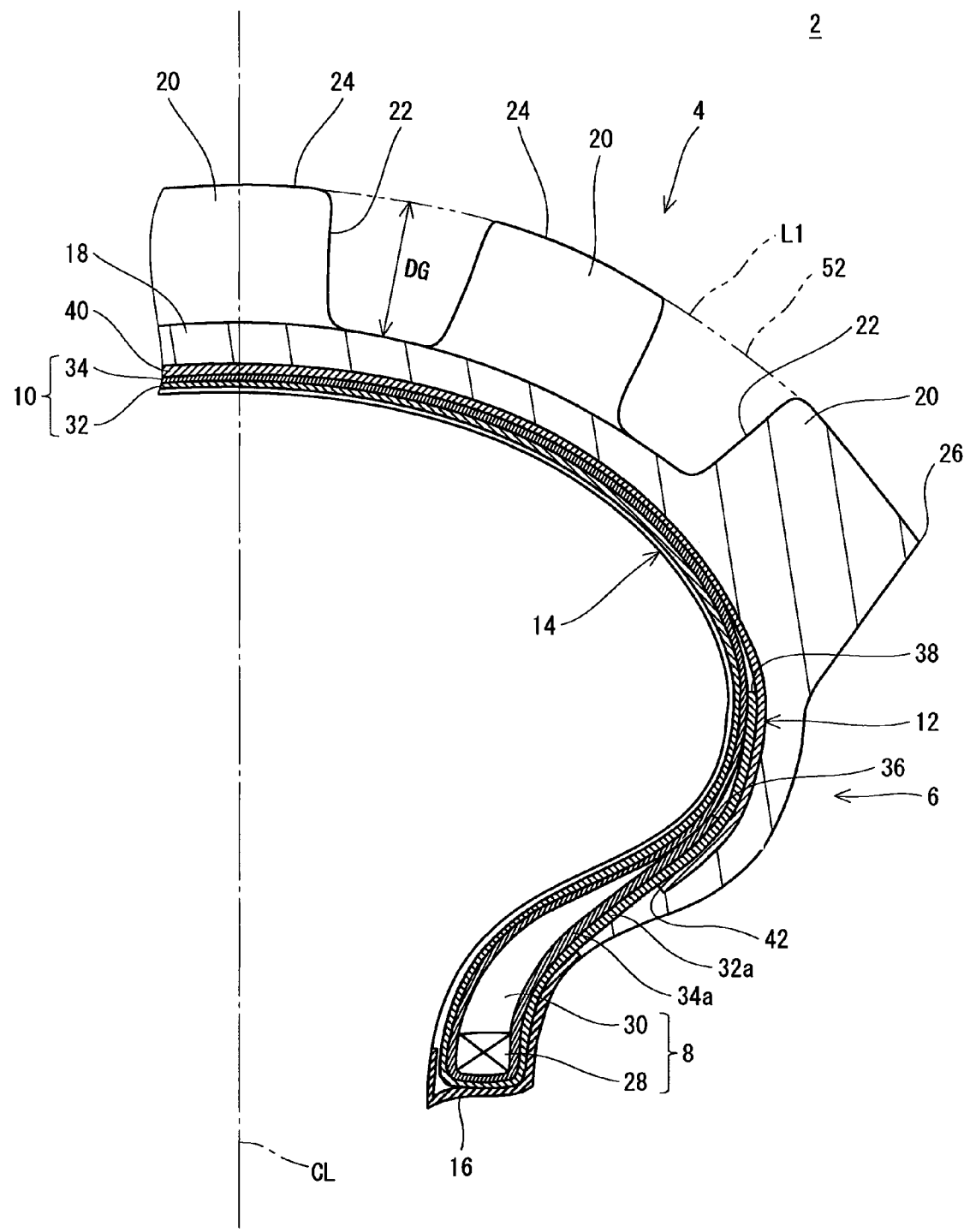
FIG. 1 is a sectional view showing a part of a pneumatic tire according to an embodiment of the present invention.

A motorcycle tire 2 for an off-road shown in FIG. 1 comprises a tread 4, a sidewall 6, a bead 8, a carcass 10, a belt 12, an inner liner 14 and a chafer 16. The tire 2 is a pneumatic tire. The tire 2 is attached to a motorcycle which runs over the off-road. The tire 2 includes a tube for filling an inner part thereof with air, which is not shown. The tire 2 is of a tube type. The tire 2 may be of a tubeless type. In FIG. 1, a vertical direction is set to be a radial direction, a transverse direction is set to be an axial direction, and a perpendicular direction to a paper is set to be a circumferential direction. The tire 2 takes an almost symmetrical shape about a one-dotted chain line CL in FIG. 1. The one-dotted chain line CL represents an equator plane of the tire 2.

The tread 4 is formed by a crosslinked rubber which is excellent in an abrasion resistance. The tread 4 takes an outward convex shape in the radial direction. The tread 4 includes a base 18 and a large number of blocks 20 which are erected almost outward in the radial direction from the base 18. A groove 22 is formed between one of the blocks 20 and the other block 20. In the tire 2, the adjacent blocks 20 are separated from each other through the groove 22. An external surface of the block 20 forms a land 24. The land 24 mainly comes in contact with a smooth road surface. A part of the tire 2 is buried in a soft ground and the block 20 sweeps mud. The block 20 can contribute to a tractive force of the tire 2. In the tire 2, an external end of the block 20 positioned on an outside in the axial direction forms an end 26 of the tread 4.

The sidewall 6 is extended almost inward in the radial direction from the tread 4. The sidewall 6 is formed by a crosslinked rubber. The sidewall 6 absorbs a shock from the road surface through a flexure. Furthermore, the sidewall 6 prevents an external damage of the carcass 10.

The bead 8 is positioned on an almost inside in the radial direction from the sidewall 6. The bead 8 includes a core 28 and an apex 30 extended outward in the radial direction from the core 28. The core 28 is ring-shaped. The core 28 includes a plurality of non-extensible wires (typically, wires formed of steel). The apex 30 is outward tapered in the radial direction. The apex 30 is formed by a crosslinked rubber having a high hardness.

The carcass 10 includes a first ply 32 and a second ply 34. The first ply 32 and the second ply 34 are laid between the beads 8 on both sides along the insides of the tread 4 and the sidewall 6. The first ply 32 and the second ply 34 are turned up from an inside toward an outside in the axial direction around the core 28. A first ply 32a turned up is positioned on an outside in the axial direction of a second ply 34a turned up. An end 36 of the second ply 34 is positioned on an inside of an end 38 of the first ply 32 in the radial direction. In the tire 2, the second ply 34a turned up is covered with the first ply 32a turned up.

The belt 12 is positioned on an outside in the radial direction of the carcass 10. The belt 12 is provided on the carcass 10. The belt 12 reinforces the carcass 10. The belt 12 is constituted by a ply 40. In the tire 2, an end 42 of the ply 40 is positioned on an inside of the end 38 of the first ply 32 in the radial direction. The end 42 of the ply 40 is positioned on an inside of the end 36 of the second ply 34 in the radial direction. A part of the ply 40 overlaps with a part of the first ply 32a turned up and a part of the second ply 34a turned up in the axial direction. The belt 12 may be constituted by two plies 40.

The ply 40 is constituted by a large number of cords provided in parallel and a topping rubber, which is not shown. Each of the cords is inclined to the equator plane. An absolute value of an angle formed by the cord with respect to the equator plane is equal to or greater than 10 degrees and is equal to or smaller than 35 degrees. The ply 40 is referred to as a cut ply. It is preferable that the cord should be constituted by an organic fiber. Examples of the organic fiber include a nylon fiber, a polyester fiber, a rayon fiber, a polyethylene naphthalate fiber and an aramid fiber. Steel may be used for the cord. The belt 12 may be constituted by the ply 40 including a cord which is extended substantially in a circumferential direction and is wound spirally. In this case, the belt 12 has a jointless structure. The ply 40 is referred to as a JLB ply.

The inner liner 14 is bonded to an inner peripheral surface of the carcass 10. The inner liner 14 is formed by a crosslinked rubber. A rubber having an excellent air sealing property is used for the inner liner 14. The inner liner 14 plays a part in holding the internal pressure of the tire 2.

The chafer 16 is positioned in the vicinity of the bead 8. When the tire 2 is incorporated into a rim, the chafer 16 abuts on the rim. By the abutment, the vicinity of the bead 8 is protected. The chafer 16 is usually constituted by a cloth and a rubber impregnated in the cloth. It is also possible to use the chafer 16 formed by a single rubber.

Figure 2:
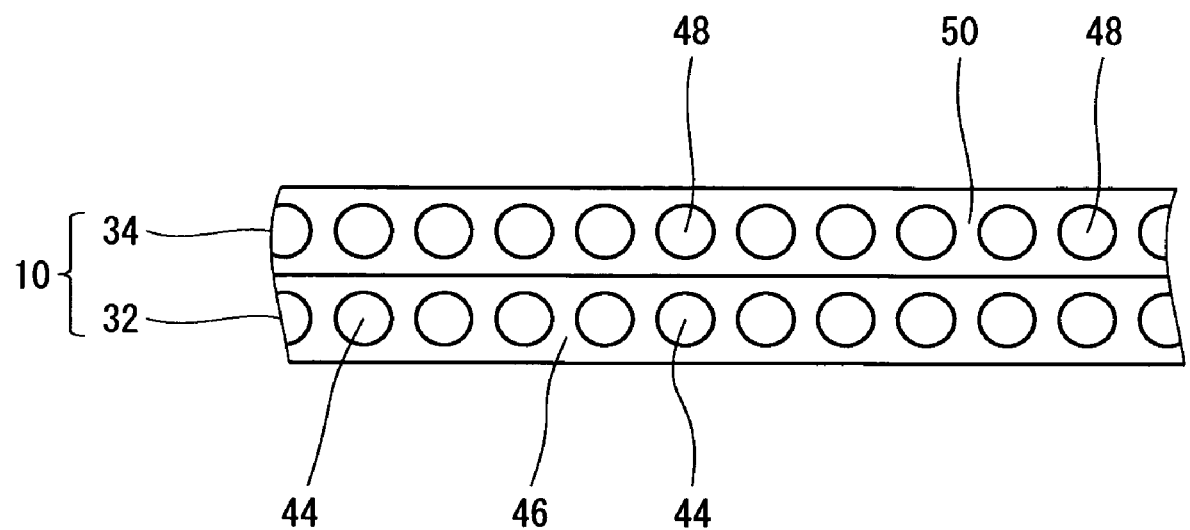
FIG. 2 is an enlarged sectional view showing a part of a carcass of the tire in FIG. 1.

FIG. 2 is an enlarged sectional view showing a part of the carcass 10 of the tire 2 in FIG. 1. As shown in FIG. 2, the first ply 32 is formed by a large number of first cords 44 provided in parallel and a topping rubber 46. An absolute value of an angle formed by the first cord 44 with respect to the equator plane is 65 to 90 degrees. As shown in FIG. 2, the second ply 34 is formed by a large number of second cords 48 provided in parallel and a topping rubber 50. An absolute value of an angle formed by the second cord 48 with respect to the equator plane is 65 to 90 degrees. In other words, the carcass 10 of the tire 2 has a radial structure. In the tire 2, the carcass 10 is constituted in such a manner that an inclining direction of the first cord 44 to the equator plane is reversed to that of the second cord 48 to the equator plane when absolute values of angles formed by the first cord 44 and the second cord 48 with respect to the equator plane are smaller than 90 degrees.

In the tire 2, the first cord 44 included in the first ply 32 is formed by twisting three yarns, which is not shown. In the tire 2, the yarn is constituted by an aramid fiber. For this reason, a modulus of the first cord 44 is higher than that of a cord constituted by a polyester fiber, a nylon fiber, a rayon fiber or a polyethylene naphthalate fiber. The first ply 32 including the first cord 44 can contribute to a stiffness feeling of the tire 2.

A conventional cord constituted by the aramid fiber is formed by twisting two yarns. As described above, in the tire 2, the first cord 44 is constituted by three yarns. A durability of the first cord 44 is more excellent than that of the conventional cord. In the tire 2, a fatigue break of the first cord 44 can be prevented. Accordingly, the tire 2 is excellent in the durability.

The conventional yarn constituting the cord formed of the aramid fiber has a fineness of 1670 dtex. As will be described below, in the tire 2, a fineness of the yarn constituting the first cord 44 is lower than that of the conventional yarn. The first cord 44 is formed by twisting three yarns having low finenesses. The first cord 44 has a flexibility. The first ply 32 including the first cord 44 can contribute to a following property to a road surface of the tire 2. A yarn having a low fineness has a small weight. Therefore, the first cord 44 constituted by the yarn less influences a weight of the tire 2.

In the tire 2, the second cord 48 included in the second ply 34 is formed by twisting three yarns, which is not shown. In the tire 2, the yarn is constituted by the aramid fiber. Therefore, a modulus of the second cord 48 is higher than that of the cord constituted by the polyester fiber, the nylon fiber, the rayon fiber or the polyethylene naphthalate fiber. The second ply 34 including the second cord 48 can contribute to the stiffness feeling of the tire 2.

As described above, in the tire 2, the second cord 48 is constituted by three yarns. A durability of the second cord 48 is more excellent than that of the conventional cord constituted by two yarns. In the tire 2, a fatigue break of the second cord 48 can be prevented. Accordingly, the tire 2 is excellent in the durability.

As will be described below, in the tire 2, a fineness of the yarn constituting the second cord 48 is lower than that of the conventional yarn (1670 dtex). The second cord 48 is formed by twisting three yarns having low finenesses. The second cord 48 has a flexibility. The second ply 34 including the second cord 48 can contribute to the following property to a road surface of the tire 2. A yarn having a low fineness has a small weight. Therefore, the second cord 48 constituted by the yarn less influences the weight of the tire 2.

In the tire 2, a fineness of the yarn constituting the first cord 44 is equal to or higher than 800 dtex and is equal to or lower than 1100 dtex. When the fineness is set to be equal to or higher than 800 dtex, the first cord 44 can contribute to a stiffness of the first ply 32. The tire 2 having the first ply 32 is excellent in the stiffness feeling. The first cord 44 having the fineness set to be equal to or lower than 1100 dtex has a proper flexibility. The first ply 32 including the first cord 44 can contribute to the following property to a road surface of the tire 2.

In the tire 2, a fineness of the yarn constituting the second cord 48 is equal to or higher than 800 dtex and is equal to or lower than 1100 dtex. When the fineness is set to be equal to or higher than 800 dtex, the second cord 48 can contribute to a stiffness of the second ply 34. The tire 2 having the second ply 34 is excellent in the stiffness feeling. The second cord 48 having the fineness set to be equal to or lower than 1100 dtex has a proper flexibility. The second ply 34 including the second cord 48 can contribute to the following property to a road surface of the tire 2.

In the tire 2, it is preferable that a density of the first cord 44 in the first ply 32 should be equal to or higher than 30 ends/5 cm and should be equal to or lower than 60 ends/5 cm. When the density is set to be equal to or higher than 30 ends/5 cm, the first ply 32 can contribute to the stiffness feeling of the tire 2. From this viewpoint, it is more preferable that the density should be equal to or higher than 40 ends/5 cm. When the density is set to be equal to or lower than 60 ends/5 cm, the stiffness of the first ply 32 can be prevented from being increased excessively. The first ply 32 can contribute to the following property to a road surface of the tire 2. From this viewpoint, it is more preferable that the density should be equal to or lower than 50 ends/5 cm. By measuring the number (ends) of the first cords 44 present per 5-cm width of the first ply 32 in a perpendicular section in a longitudinal direction of the first cord 44, it is possible to obtain the density. The density of the second cord 48 in the second ply 34 which will be described below is also measured in the same manner.

In the tire 2, it is preferable that a density of the second cord 48 in the second ply 34 should be equal to or higher than 30 ends/5 cm and should be equal to or lower than 60 ends/5 cm. When the density is set to be equal to or higher than 30 ends/5 cm, the second ply 34 can contribute to the stiffness feeling of the tire 2. From this viewpoint, it is more preferable that the density should be equal to or higher than 40 ends/5 cm. When the density is set to be equal to or lower than 60 ends/5 cm, the stiffness of the second ply 34 can be prevented from being increased excessively. The second ply 34 can contribute to the following property to a road surface of the tire 2. From this viewpoint, it is more preferable that the density should be equal to or lower than 50 ends/5 cm.

In the tire 2, the first cord 44 is formed in the following manner. First of all, the yarn is originally twisted. Next, three yarns twisted originally are twisted finally so that the first cord 44 is formed. A direction of the final twist is reverse to that of the original twist. In the tire 2, the second cord 48 is also formed in the same manner as the first cord 44. In this specification, a twist number in the original twist corresponds to an original twist number and a twist number in the final twist corresponds to a final twist number. The original twist number and the final twist number are measured in accordance with JIS-L1017.

In the tire 2, it is preferable that the original twist number of the first cord 44 should be equal to or larger than 30 times/10 cm and should be equal to or smaller than 60 times/10 cm. The first ply 32 including the first cord 44 having the original twist number set to be equal to or larger than 30 times/10 cm can contribute to the durability of the tire 2. From this viewpoint, it is more preferable that the original twist number should be equal to or larger than 40 times/10 cm. The first ply 32 including the first cord 44 having the original twist number set to be equal to or smaller than 60 times/10 cm can contribute to the stiffness feeling of the tire 2. From this viewpoint, it is more preferable that the original twist number should be equal to or smaller than 50 times/10 cm.

In the tire 2, it is preferable that the final twist number of the first cord 44 should be equal to or larger than 30 times/10 cm and should be equal to or smaller than 60 times/10 cm. The first ply 32 including the first cord 44 having the final twist number set to be equal to or larger than 30 times/10 cm can contribute to the durability of the tire 2. From this viewpoint, it is more preferable that the final twist number should be equal to or larger than 40 times/10 cm. The first ply 32 including the first cord 44 having the final twist number set to be equal to or smaller than 60 times/10 cm can contribute to the stiffness feeling of the tire 2. From this viewpoint, it is more preferable that the final twist number should be equal to or smaller than 50 times/10 cm.

In the tire 2, it is preferable that the original twist number of the second cord 48 should be equal to or larger than 30 times/10 cm and should be equal to or smaller than 60 times/10 cm. The second ply 34 including the second cord 48 having the original twist number set to be equal to or larger than 30 times/10 cm can contribute to the durability of the tire 2. From this viewpoint, it is more preferable that the original twist number should be equal to or larger than 40 times/10 cm. The second ply 34 including the second cord 48 having the original twist number set to be equal to or smaller than 60 times/10 cm can contribute to the stiffness feeling of the tire 2. From this viewpoint, it is more preferable that the original twist number should be equal to or smaller than 50 times/10 cm.

In the tire 2, it is preferable that the final twist number of the second cord 48 should be equal to or larger than 30 times/10 cm and should be equal to or smaller than 60 times/10 cm. The second ply 34 including the second cord 48 having the final twist number set to be equal to or larger than 30 times/10 cm can contribute to the durability of the tire 2. From this viewpoint, it is more preferable that the final twist number should be equal to or larger than 40 times/10 cm. The second ply 34 including the second cord 48 having the final twist number set to be equal to or smaller than 60 times/10 cm can contribute to the stiffness feeling of the tire 2. From this viewpoint, it is more preferable that the final twist number should be equal to or smaller than 50 times/10 cm.

In FIG. 1, a two-dotted chain line L1 indicates an external surface of the tread 4 on the assumption that the tread 4 has no groove 22. The external surface is indicated as a tread surface 52. A double arrow line DG indicates a groove depth of the tread 4. The groove depth DG is represented by a length from the tread surface 52 to a bottom of the groove 22.

In the tire 2, it is preferable that the groove depth DG of the tread 4 should be equal to or greater than 14 mm and should be equal to or smaller than 19 mm. When the groove depth DG is set to be equal to or greater than 14 mm, the block 20 can contribute to the tractive force of the tire 2. From this viewpoint, it is more preferable that the groove depth DG should be equal to or greater than 15 mm. When the groove depth DG is set to be equal to or smaller than 19 mm, the durability of the block 20 can be maintained. From this viewpoint, it is more preferable that the groove depth DG should be equal to or smaller than 18 mm.

Figure 3:
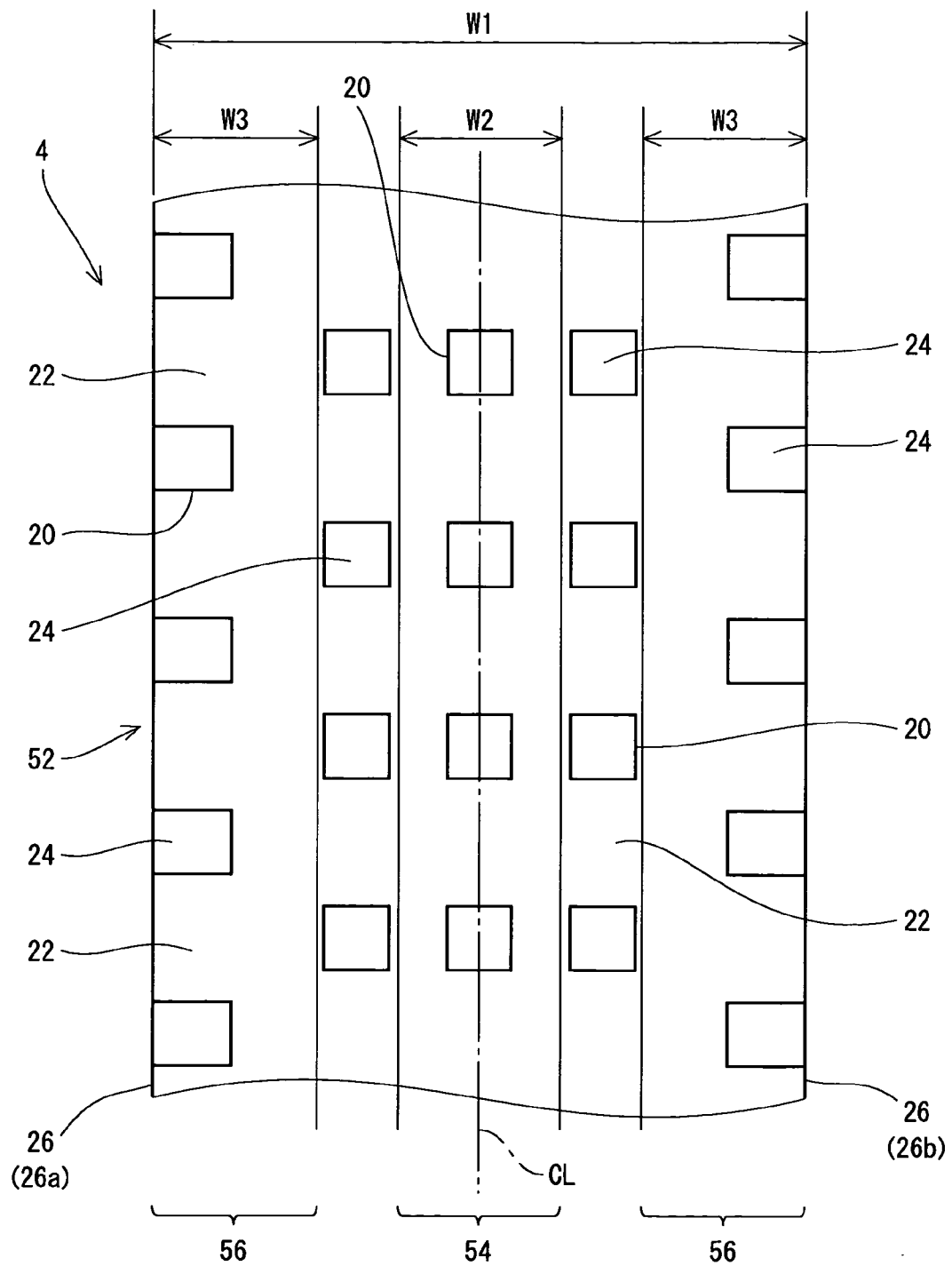
FIG. 3 is a developed view showing a part of the tire in FIG. 1.

FIG. 3 is a developed view showing a part of the tire 2 in FIG. 1. In FIG. 3, a vertical direction indicates a circumferential direction and a transverse direction indicates an axial direction. A one-dotted chain line CL indicates the equator plane of the tire 2. The tread surface 52 is shown in FIG. 3. As shown in FIG. 3, the tread surface 52 is constituted by the land 24 and the groove 22. In this specification, a ratio of an area of the land 24 to that of the groove 22 is referred to as a land/sea ratio of the tread 4.

In the tire 2, it is preferable that the land/sea ratio of the tread 4 should be equal to or higher than 10% and should be equal to or lower than 35%. By setting the land/sea ratio to be equal to or higher than 10%, it is possible to maintain the durability of the block 20. From this viewpoint, it is more preferable that the land/sea ratio should be equal to or higher than 15%. When the land/sea ratio is set to be equal to or lower than 35%, the tire 2 can exhibit an excellent grip property. From this viewpoint, it is more preferable that the land/sea ratio should be equal to or lower than 30%.

As shown in FIG. 3, in the tread surface 52 of the tire 2, the vicinity of the equator plane is indicated as a center region 54. A region provided from the end 26 of the tread 4 toward the equator plane is indicated as a shoulder region 56. In FIG. 3, a double arrow line W1 represents a developing width of the tread surface 52. The developing width W1 is equal to a peripheral length from an end 26a of one of the treads 4 to an end 26b of the other tread 4. A double arrow line W2 represents a developing width of the center region 54. As shown in FIG. 3, the equator plane is positioned on a center of the developing width W2. A double arrow line W3 represents a developing width of the shoulder region 56. In the tire 2, a ratio of the developing width W2 to the developing width W1 is 25%. A ratio of the developing width W3 to the developing width W1 is 25%.

In this specification, a ratio of a total volume of the blocks 20 disposed in the center region 54 to that of the blocks 20 disposed in the shoulder region 56 is referred to as a block volume ratio of the tread 4. In the tire 2, it is preferable that the block volume ratio should be equal to or higher than 50% and should be equal to or lower than 100%. When the block volume ratio is set to be equal to or higher than 50%, the blocks 20 disposed in the center region 54 can effectively contribute to a straight running stability of the tire 2. From this viewpoint, it is more preferable that the block volume ratio should be equal to or higher than 60%. When the block volume ratio is set to be equal to or lower than 100%, the blocks 20 disposed in the shoulder region 56 can effectively contribute to a cornering stability of the tire 2. From this viewpoint, it is more preferable that the block volume ratio should be equal to or lower than 90%.

In the present invention, the dimension and the angle of each member of the tire 2 are measured in a state in which the tire 2 is incorporated in a normal rim and is filled with air to obtain a normal internal pressure. During the measurement, a load is not applied to the tire 2. In this specification, the normal rim implies a rim determined in rules on which the tire 2 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure.

EXAMPLES

Example 1

There was obtained a motorcycle tire for an off-road according to an example 1 which has a basic structure shown in FIG. 1 and has a specification shown in the following Table 2. The tire has a size of "120/80-19 63M". In the tire, a land/sea ratio of a tread is 25%. A block volume ratio of the tread is 75%. A groove depth DG of the tread is 16.5 mm. A belt is formed by a ply. The ply is a cut ply. In the Tables, the cut ply is represented as CUT. The ply includes a cord formed by a nylon fiber. The cord has a fineness of 1890 dtex/2. A carcass includes a first ply and a second ply. In the tire, the first ply and the second ply are constituted by the same ply. The number of the plies of the carcass is two. The ply includes a cord formed by twisting three yarns. An absolute value of an angle formed by the cord with respect to an equator plane is 90 degrees. The carcass has a radial structure. A density of the cord in the ply is 40 ends/5 cm. The original twist number of the cord is 45 times/10 cm. The final twist number of the cord is 45 times/10 cm. The yarn is formed by an aramid fiber. The yarn has a fineness of 1100 dtex.

Comparative Example 5

A tire was obtained in the same manner as in the example 1 except that the number of yarns was set as shown in the following Table 1.

Comparative Examples 7 and 8 and Example 2

A tire was obtained in the same manner as in the example 1 except that a fineness of a yarn was set as shown in the following Tables 1, 2 and 3.

Examples 5, 6, 7 and 8

A tire was obtained in the same manner as in the example 1 except that a density of a cord was set as shown in the following Tables 2 and 3.

Examples 3, 4, 9 and 10

A tire was obtained in the same manner as in the example 1 except that the original twist number and the final twist number were set as shown in the following Tables 2 and 3.

Comparative Example 6

A tire was obtained in the same manner as in the example 1 except that the number of yarns and a fineness thereof were set as shown in the following Table 1.

Comparative Example 4

A tire was obtained in the same manner as in the example 1 except that the number of yarns and a type and fineness thereof were set as shown in the following Table 1.

Comparative Example 3

A tire was obtained in the same manner as in the example 1 except that the number of plies constituting a belt, and the number of yarns and a type and fineness thereof were set as shown in the following Table 1.

Example 11

A tire was obtained in the same manner as in the example 1 except that a ply constituting a belt was set to be a JLB ply (the ply is indicated as JLB in the Table 3).

Comparative Examples 1 and 2

A conventional tire put on the market is used. In comparative examples 1 and 2, a belt is not provided. A carcass according to the comparative example 1 and a carcass according to the comparative example 2 have a radial structure. The carcass according to the comparative example 1 is formed by three plies. The number of yarns constituting a cord included in the ply is two. The carcass according to the comparative example 2 is formed by two plies. The number of yarns constituting a cord included in the ply is two and the yarn has a fineness of 1670 dtex.

[Actual Vehicle Evaluation]

A trial tire was incorporated into a standard rim and was filled with air to have a standard internal pressure. The tire was attached to a motorcycle for a motocross of a 4-stroke type which has a displacement of 450 cm$^3$. The motorcycle was caused to run on a course of a motocross race and a sensuous evaluation was carried out by a rider. The rider made 15 rounds on the course by the motorcycle. A time taken for running per round was two minutes. An evaluation was executed for a following property to a road surface, a stiffness feeling and a durability. The result is shown as an index number with the comparative example 1 set to be 100 in the following Tables 1, 2 and 3.

TABLE 1

Specification of tire and result of evaluation

| | | | Comp. example 1 | Comp. example 2 | Comp. example 3 | Comp. example 4 | Comp. example 5 | Comp. example 6 | Comp. example 7 |
|---|---|---|---|---|---|---|---|---|---|
| Tread | | Land/sea ratio [%] | 25 | 25 | 25 | 25 | 25 | 25 | 25 |
| | | Block volume ratio [%] | 75 | 75 | 75 | 75 | 75 | 75 | 75 |
| | | Groove depth DG [mm] | 16.5 | 16.5 | 16.5 | 16.5 | 16.5 | 16.5 | 16.5 |
| Belt | | Type of ply | — | — | CUT | CUT | CUT | CUT | CUT |
| | | Number of plies [piece] | — | — | 2 | 1 | 1 | 1 | 1 |
| | | Type of cord | — | — | Nylon | Nylon | Nylon | Nylon | Nylon |
| | | Fineness of cord [dtex] | — | — | 1890 | 1890 | 1890 | 1890 | 1890 |
| Carcass | | Structure | Bias | Bias | Radial | Radial | Radial | Radial | Radial |
| | | Number of plies [piece] | 3 | 2 | 2 | 2 | 2 | 2 | 2 |
| | Ply | Density of cord [ends/5 cm] | 40 | 40 | 40 | 40 | 40 | 40 | 40 |
| | | Final twist number [times/10 cm] | 45 | 45 | 45 | 45 | 45 | 45 | 45 |
| | | Original twist number [times/10 cm] | 45 | 45 | 45 | 45 | 45 | 45 | 45 |
| | | Number of yarns [piece] | 2 | 2 | 2 | 2 | 2 | 2 | 3 |
| | | Type of yarn | Aramid | Aramid | Nylon | Nylon | Aramid | Aramid | Aramid |
| | | Fineness of yarn [dtex] | 1100 | 1670 | 1890 | 1890 | 1100 | 1670 | 700 |
| | | Following property to road surface | 100 | 105 | 90 | 110 | 115 | 110 | 110 |
| | | Stiffness feeling | 100 | 90 | 100 | 80 | 90 | 120 | 90 |
| | | Durability | 100 | 90 | 90 | 90 | 70 | 90 | 90 |

TABLE 2

Specification of tire and result of evaluation

| | | | Example 2 | Example 3 | Example 4 | Example 5 | Example 6 | Example 1 |
|---|---|---|---|---|---|---|---|---|
| Tread | | Land/sea ratio [%] | 25 | 25 | 25 | 25 | 25 | 25 |
| | | Block volume ratio [%] | 75 | 75 | 75 | 75 | 75 | 75 |
| | | Groove depth DG [mm] | 16.5 | 16.5 | 16.5 | 16.5 | 16.5 | 16.5 |
| Belt | | Type of ply | CUT | CUT | CUT | CUT | CUT | CUT |
| | | Number of plies [piece] | 1 | 1 | 1 | 1 | 1 | 1 |
| | | Type of cord | Nylon | Nylon | Nylon | Nylon | Nylon | Nylon |
| | | Fineness of cord [dtex] | 1890 | 1890 | 1890 | 1890 | 1890 | 1890 |
| Carcass | | Structure | Radial | Radial | Radial | Radial | Radial | Radial |
| | | Number of plies [piece] | 2 | 2 | 2 | 2 | 2 | 2 |
| | Ply | Density of cord [ends/5 cm] | 40 | 40 | 40 | 20 | 30 | 40 |

TABLE 2-continued

Specification of tire and result of evaluation

|  | Example 2 | Example 3 | Example 4 | Example 5 | Example 6 | Example 1 |
|---|---|---|---|---|---|---|
| Final twist number [times/10 cm] | 45 | 20 | 30 | 45 | 45 | 45 |
| Original twist number [times/10 cm] | 45 | 20 | 30 | 45 | 45 | 45 |
| Number of yarns [piece] | 3 | 3 | 3 | 3 | 3 | 3 |
| Type of yarn | Aramid | Aramid | Aramid | Aramid | Aramid | Aramid |
| Fineness of yarn [dtex] | 840 | 1100 | 1100 | 1100 | 1100 | 1100 |
| Following property to road surface | 125 | 115 | 120 | 100 | 115 | 120 |
| Stiffness feeling | 95 | 110 | 105 | 90 | 100 | 100 |
| Durability | 100 | 90 | 95 | 85 | 95 | 100 |

TABLE 3

Specification of tire and result of evaluation

|  |  | Example 7 | Example 8 | Example 9 | Example 10 | Comp. example 8 | Example 11 |
|---|---|---|---|---|---|---|---|
| Tread | Land/sea ratio [%] | 25 | 25 | 25 | 25 | 25 | 25 |
|  | Block volume ratio [%] | 75 | 75 | 75 | 75 | 75 | 75 |
|  | Groove depth DG [mm] | 16.5 | 16.5 | 16.5 | 16.5 | 16.5 | 16.5 |
| Belt | Type of ply | CUT | CUT | CUT | CUT | CUT | JLB |
|  | Number of plies [piece] | 1 | 1 | 1 | 1 | 1 | 1 |
|  | Type of cord | Nylon | Nylon | Nylon | Nylon | Nylon | Nylon |
|  | Fineness of cord [dtex] | 1890 | 1890 | 1890 | 1890 | 1890 | 1890 |
| Carcass | Structure | Radial | Radial | Radial | Radial | Radial | Radial |
|  | Number of plies [piece] | 2 | 2 | 2 | 2 | 2 | 2 |
| Ply | Density of cord [ends/5 cm] | 60 | 70 | 40 | 40 | 40 | 40 |
|  | Final twist number [times/10 cm] | 45 | 45 | 60 | 70 | 45 | 45 |
|  | Original twist number [times/10 cm] | 45 | 45 | 60 | 70 | 45 | 45 |
|  | Number of yarns [piece] | 3 | 3 | 3 | 3 | 3 | 3 |
|  | Type of yarn | Aramid | Aramid | Aramid | Aramid | Aramid | Aramid |
|  | Fineness of yarn [dtex] | 1100 | 1100 | 1100 | 1100 | 1670 | 1100 |
| Following property to road surface |  | 105 | 90 | 120 | 120 | 105 | 130 |
| Stiffness feeling |  | 120 | 110 | 100 | 90 | 125 | 100 |
| Durability |  | 100 | 100 | 100 | 100 | 100 | 100 |

As shown in the Tables 1, 2 and 3, the tire according to each of the examples is excellent in the following property to a road surface, the stiffness feeling and the durability. From the result of the evaluation, the advantages of the present invention are apparent.

The above description is only illustrative and various changes can be made without departing from the scope of the present invention.

What is claimed is:

1. An off-road motorcycle tire comprising a tread formed from a crosslinked rubber, a pair of beads, and a carcass laid between both of the beads along an inside of the tread and having a radial structure,
    wherein the tread includes a base and a large number of blocks erected almost outward in a radial direction from the base,
    the carcass includes a first ply and a second ply,
    the first ply has a first cord,
    the first cord is formed by twisting three yarns,
    the yarn is constituted by an aramid fiber,
    a fineness of the yarn is equal to or higher than 800 dtex and is equal to or lower than 1100 dtex,
    the second ply has a second cord,
    the second cord is formed by twisting three yarns,
    the yarn is constituted by the aramid fiber, and
    a fineness of the yarn is equal to or higher than 800 dtex and is equal to or lower than 1100 dtex, and
    wherein the first cord in the first ply, and the second cord in the second ply, both have a density of equal to or higher than 30 ends/5 cm and equal to or lower than 60 ends/5 cm.

2. The tire according to claim 1, wherein an original twist number of the first cord is equal to or larger than 30 times/10 cm and is equal to or smaller than 60 times/10 cm, and
    a final twist number of the first cord is equal to or larger than 30 times/10 cm and is equal to or smaller than 60 times/10 cm.

3. The tire according to claim 1, wherein an original twist number of the second cord is equal to or larger than 30 times/10 cm and is equal to or smaller than 60 times/10 cm, and
    a final twist number of the second cord is equal to or larger than 30 times/10 cm and is equal to or smaller than 60 times/10 cm.

4. The tire according to claim 1, wherein a groove depth of the tread is equal to or greater than 14 mm and is equal to or smaller than 19 mm,
    a land/sea ratio of the tread is equal to or higher than 10%, and
    a block volume ratio of the tread is equal to or higher than 50% and is equal to or lower than 100%.

5. The tire according to claim 2, wherein an original twist number of the second cord is equal to or larger than 30 times/10 cm and is equal to or smaller than 60 times/10 cm, and a final twist number of the second cord is equal to or larger than 30 times/10 cm and is equal to or smaller than 60 times/10 cm.

6. The tire according to claim 5, wherein a groove depth of the tread is equal to or greater than 14 mm and is equal to or smaller than 19 mm, a land/sea ratio of the tread is equal to or higher than 10%, and a block volume ratio of the tread is equal to or higher than 50% and is equal to or lower than 100%.

* * * * *